United States Patent [19]

Fujioka

[11] Patent Number: 5,302,160
[45] Date of Patent: Apr. 12, 1994

[54] PLANET-PINION CARRIER ASSEMBLY FOR PLANETARY GEAR SYSTEM

[75] Inventor: Kazuyoshi Fujioka, Shizuoka, Japan

[73] Assignee: Jatco Corporation, Japan

[21] Appl. No.: 9,443

[22] Filed: Jan. 27, 1993

Related U.S. Application Data

[63] Continuation of Ser. No. 498,764, Mar. 26, 1990.

[30] Foreign Application Priority Data

Mar. 28, 1989 [JP] Japan ............... 1-34387[U]

[51] Int. Cl.$^5$ .............................................. F16H 3/44
[52] U.S. Cl. ..................................... 475/348; 475/901
[58] Field of Search ............... 475/901, 348; 29/527.2, 29/527.4; 384/420, 423, 625

[56] References Cited

U.S. PATENT DOCUMENTS

| Re. 26,578 | 5/1969 | Naumann | 475/901 |
|---|---|---|---|
| 3,494,749 | 2/1970 | Arnoldy | 29/527.2 |
| 3,686,978 | 8/1972 | Knoblach | 475/348 |
| 4,222,290 | 9/1980 | Helmer et al. | 475/348 |
| 4,480,492 | 11/1984 | Fujioka et al. | 475/348 |
| 4,509,803 | 4/1985 | Takenaka et al. | 384/907 X |
| 4,533,403 | 8/1985 | Aves, Jr. et al. | 148/27 X |
| 4,623,087 | 11/1986 | Conolly | 29/527.2 |
| 4,756,212 | 7/1988 | Fuehrer | 475/348 |
| 4,776,237 | 10/1988 | Premiski et al. | 475/346 X |
| 4,901,601 | 2/1990 | Leggat | 475/348 |
| 4,916,981 | 4/1990 | Suzuki et al. | 475/901 |
| 4,916,981 | 4/1990 | Suzuki et al. | 384/625 X |

FOREIGN PATENT DOCUMENTS

| 3617087 | 5/1986 | Fed. Rep. of Germany . | |
| 3622671 | 8/1987 | Fed. Rep. of Germany . | |
| 4009968 | 11/1990 | Fed. Rep. of Germany | 475/901 |
| 62-40346 | 3/1987 | Japan . | |
| 3-69840 | 3/1991 | Japan | 475/348 |

OTHER PUBLICATIONS

Machine Design Theory and Practice MacMillan Publishing Co., Inc. 1975 pp. 55, 879, 880.
Marks' Standard Handbook for Mechanical Engineers McGraw-Hill, pp. 6-93, 6-139.
Merkblatt Stahl 446, Waermebehandlung zum Aendern des Randbereichs von Stahlteilen Borieren; 1st edition Duesseldorf; Beratungsstelle fuer Stahlverwendung 1979.

Primary Examiner—Leslie A. Braun
Assistant Examiner—Ryan W. Massey
Attorney, Agent, or Firm—Ronald P. Kananen

[57] ABSTRACT

A planet-pinion carrier assembly for a planetary gear system includes a planet-pinion carrier having first and second radially extending sections, planet pinions each rotatably mounted onto a pinion shaft through a bearing, a first thrust washer disposed between one axial end of each planet pinion and the first section, and a second thrust washer disposed between the other axial end of each planet pinion and the second section. The first and second thrust washers each have a surface hardness large enough to ensure an improved durability and reliability.

18 Claims, 1 Drawing Sheet

PLANET-PINION CARRIER ASSEMBLY FOR PLANETARY GEAR SYSTEM

This application is a continuation of application Ser. No. 07/498,764 filed Mar. 26, 1990

BACKGROUND OF THE INVENTION

1. Field of the Invention

This invention relates generally to a planet-pinion carrier assembly for a planetary gear system to be used in an automatic transmission and, more specifically, to the planet-pinion carrier assembly, wherein thrust washers disposed between axial ends of each planet pinion and a planet-pinion carrier rotatably supporting the planet pinions have a surface hardness large enough to ensure improved durability and reliability.

2. Description of the Background Art

There is known a planet-pinion carrier assembly for a planetary gear system to be used in an automatic transmission, such as disclosed in Japanese First (Unexamined) Utility Model Publication No. 62-40346.

In this known structure, the carrier assembly includes a planet-pinion carrier having a rotation axis, planet pinions each rotatably mounted on a pinion shaft which is fixed to the pinion carrier, a needle roller bearing disposed between the pinion shaft and the planet pinion for rotatably supporting the planet pinion, and thrust washers. Specifically, the pinion carrier has first and second sections extending radially with respect to the rotation axis and axially spaced apart by a predetermined distance from each other for receiving the planet pinions therebetween. The first and second sections are fixedly connected to each other and fixedly support each of the pinion shafts therebetween. The planet pinion is rotatably mounted on each pinion shaft through the needle roller bearing. Further, a pair of the thrust washers are disposed in slidable contact with each other between one axial end surface of each planet pinion and the first section, and another pair of the thrust washers are disposed in slidable contact with each other between the other axial end surface of each planet pinion and the second section, for supporting axial loads applied thereto from the planet pinion and the needle roller bearing. By utilizing two thrust washers arranged in slidable contact with each other, a relative rotational speed between the two thrust washers, when the planet pinions are rotated, can be reduced so as to improve the durability of the thrust washers.

In this known planet-pinion carrier assembly, however, a problem exists that the durability of the thrust washers is insufficient when the applied load is large, i.e. when the planet pinions are rotated at a high speed and with a large torque. Specifically, in the known structure, each thrust washer is formed by applying a soft nitriding process to a high carbon tool steel to have a surface hardness of about Hv (Vickers hardness) 400. Accordingly, the thrust washers, particularly those which face the axial end surfaces of each planet pinion are subject to abrasion when the applied load is large, due to the contact with axial ends of the needle roller bearing and due to the load applied unevenly to the thrust washers which is caused by inclination of each mounted planet pinion.

SUMMARY OF THE INVENTION

Accordingly, it is an object of the present invention to provide a planet-pinion carrier assembly for a planetary gear system that can eliminate the above-noted defects inherent in the known structure.

It is another object of the present invention to provide a planet-pinion carrier assembly for a planetary gear system, wherein thrust washers disposed between axial end surfaces of each planet pinion and radially extending sections of a planet-pinion carrier are formed hard enough not to be subject to the abrasion so as to ensure improved durability and reliability of the thrust washers.

To accomplish the above-mentioned and other objects, according to one aspect of the present invention, a planet-pinion carrier assembly for a planetary gear system comprises a planet-pinion carrier having a rotation axis and including a first section extending radially with respect to the rotation axis and a second section radially extending and axially spacing a predetermined distance from the first section, and planet pinions each rotatably mounted onto a pinion shaft through bearing means, the pinion shaft extending between the first and second sections with its one axial end fixed to the first section and with its other axial end fixed to the second section, the planet pinions each having a first axial end facing the first section and a second axial end facing the second section.

The planet-pinion carrier assembly further includes a first thrust washer disposed between the first axial end of each planet pinion and the first section, and a second thrust washer disposed between the second axial end of each planet pinion and the second section.

The first and second thrust washers each are designed to have a surface hardness of no less than Hv 700.

According to another aspect of the present invention, in a planet-pinion carrier assembly for a planetary gear system, the planet-pinion carrier assembly including a planet-pinion carrier which has a rotation axis and includes a first section extending radially with respect to the rotation axis and a second section radially extending and axially spacing a predetermined distance from the first section, planet pinions each rotatably mounted onto a pinion shaft through bearing means, the pinion shaft extending between the first and second sections with its one axial end fixed to the first section and with its other axial end fixed to the second section, the planet pinions each having a first axial end facing the first section and a second axial end facing the second section, a first thrust washer disposed between the first axial end of each planet pinion and the first section, and a second thrust washer disposed between the second axial end of each planet pinion and the second section, a method of forming each of the first and second thrust washers comprises applying a boron dipping process to a base material to provide each of the first and second thrust washers, the first and second thrust washers each having a surface hardness of no less than Hv 700.

BRIEF DESCRIPTION OF THE DRAWINGS

The present invention will be understood more fully from the detailed description given hereinbelow and from the accompanying drawing of the preferred embodiment of the invention, which are given by way of example only, and are not intended to be limitative of the present invention.

In the drawing.

DESCRIPTION OF THE PREFERRED EMBODIMENT

Figure 1:
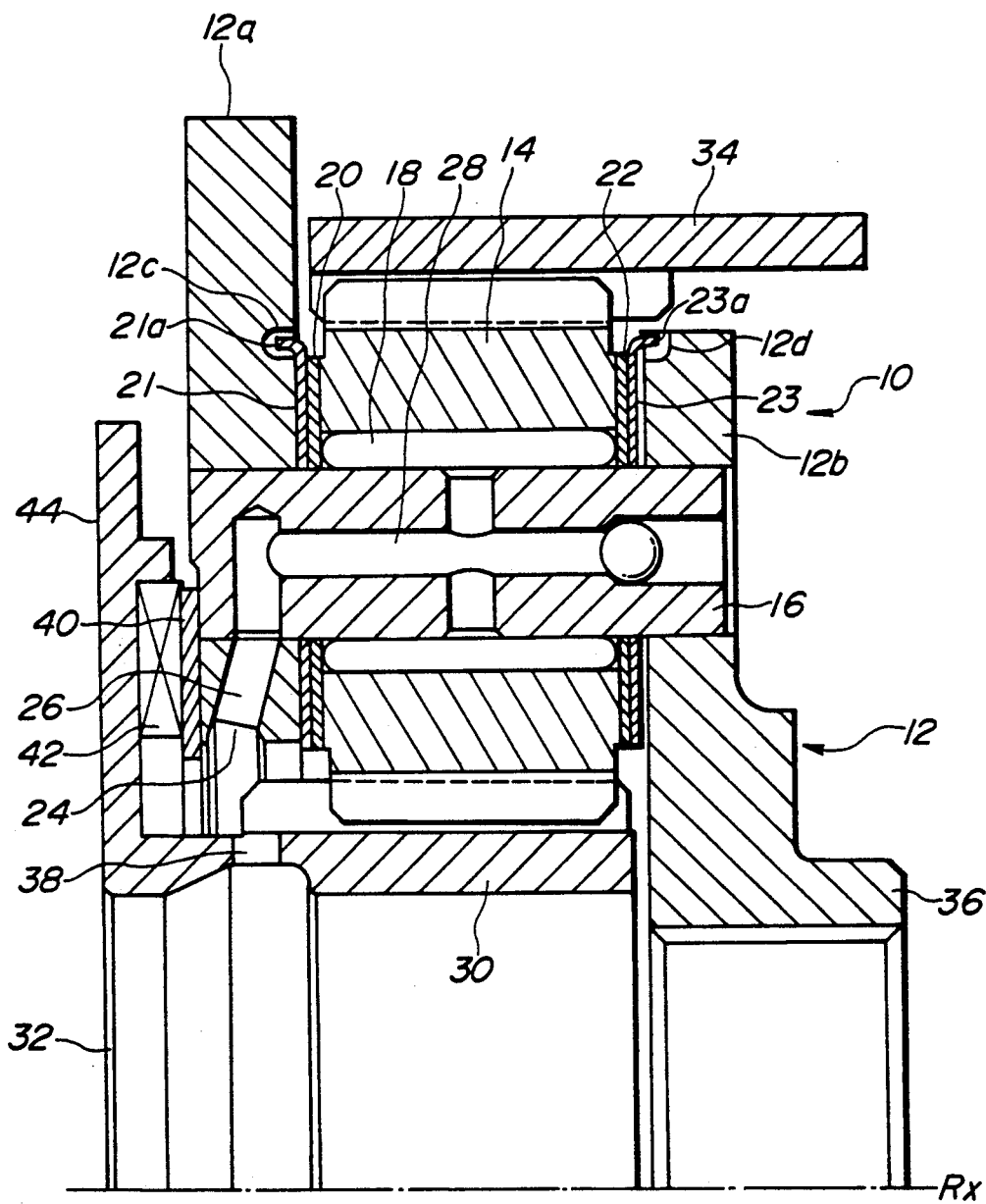
FIG. 1 is a longitudinal sectional view showing a planet-pinion carrier assembly for a planetary gear system to be used in an automatic transmission according to a preferred embodiment of the present invention.

A preferred embodiment of a planet-pinion carrier assembly for a planetary gear system to be used in an automatic transmission according to the present invention will be described with reference to FIG. 1.

In FIG. 1, a planet-pinion carrier assembly generally designated by a reference numeral 10 includes a planet-pinion carrier which is also generally designated by a reference numeral 12. The pinion carrier 12 has a rotation axis Rx and includes a first section 12a extending radially with respect to the rotation axis Rx and a second section 12b extending radially and spacing a predetermined distance from the first section 12a in the axial direction for receiving planetary pinions 14 therebetween. The first and second sections of the pinion carrier 12 are fixedly connected to each other and fixedly support each of pinion shafts 16 therebetween. Each pinion 14 is rotatably mounted onto the corresponding pinion shaft 16 through a needle roller bearing 18. A pair of thrust washers 20 and 21 are arranged axially in slidable contact with each other between one axial end surface of the pinion 14 and the first section 12a, and another pair of thrust washers 22 and 23 are also arranged axially in slidable contact with each other between the other axial end surface of the pinion 14 and the second section 12b, for supporting axial load applied thereto. The thrust washers 20 and 22 are the same members each facing the corresponding axial end surface of the pinion 14 and each being formed by applying the boron dipping process to a high carbon tool steel to provide a surface hardness of no less than Hv 700, preferably Hv 700 to 1500, and an internal or inside hardness of no more than Hv 350, preferably Hv 200 to 350. The surface hardness of no less than Hv 700 extends across a maximum thickness of 60 μm from surfaces of each of the thrust washers 20 and 22. On the other hand, the thrust washers 21 and 23 are the same members each facing the corresponding first or second section 12a or 12b and each being formed of a copper alloy material. The thrust washer 21 has a pawl 21a at its outer periphery which is fitted into a recess 12c formed at a corresponding portion of the first section 12a for preventing rotation of the thrust washer 21. Similarly, the thrust washer 23 has a pawl 23a at its outer periphery which is fitted into a recess 12d formed at a corresponding portion of the second section 12b for preventing rotation of the thrust washer 23.

An annular groove 24 is formed on the inner periphery of the first section 12a and a lubricant passage 26 is further formed in the first section 12a. The lubricant passage 26 extends radially outward from the annular groove 24 to communicate with a lubricant passage 28 formed through the pinion shaft 16. The lubricant passage 28, in turn, opens to rolling contact surfaces of rolling elements of the needle bearing 18.

A sun gear 30 has a center bore section 32 which receives a rotation shaft therein to be firmly connected thereto, and meshes with the planet pinions 14. A ring gear 34 is further provided encircling the planet pinions 14 and meshes therewith, while the pinion carrier 12 has a hub section 36 for receiving a rotation shaft to be firmly connected thereto. In this embodiment, the sun gear 30, the planet pinions 14 and the ring gear 34 are all helical gears. The sun gear 30 is formed with a lubricant passage 38 for conducting the lubricant supplied through a lubricant circuit formed in the associated rotation shaft to the annular groove 24.

An annular bearing race 40 is provided at a left side of the first section 12a in FIG. 1. The bearing race 40 receives thereon rolling elements of a thrust bearing 42 which is supported by a radial extension 44 of the sun gear 30.

Now, the operation of the foregoing preferred embodiment will be described hereinbelow.

When the planet pinions 14 are rotated, since the helical gears are used as mentioned above, a thrust load is applied to the thrust washers 20, 21 or the thrust washers 22, 23 depending on a direction of the rotation of the planet pinions 14. Further, the needle bearing 18 is also rotated to exert a load to the thrust washers 20 and 22 due to the interference between the axial ends of the needle bearing 18 and the associated thrust washers 20 and 22. However, since the thrust washers 20 and 22 each have a surface hardness of not less than Hv 700 which is large enough to prevent the abrasion, even when a substantially large load is applied to the thrust washers 20 and 22, the thrust washers 20 and 22 are not subject to the substantial abrasion so that the highly reliable durability is ensured. On the other hand, though relative rotation is generated between the thrust washers 20 and 21 and between the thrust washers 22 and 23, since the thrust washers 21 and 23 each are formed of the copper alloy material which has a high lubricity, the thrust washers 21 and 23 are not subject to the abrasion due to the sliding interference with the thrust washers 20 and 22.

The lubricant is supplied to the thrust washers 20 to 23 for lubricating same. Specifically, the lubricant introduced through the lubricant circuit formed in the rotation shaft of the sun gear 30 is introduced into the annular groove 24 through the lubricant passage 38. The lubricant is, in turn, introduced to the rolling surfaces of the needle bearing 18 through the lubricant passages 26 and 28. After lubricating the needle bearing 18, the lubricant is supplied to the thrust washers 20 to 23 through the axial ends of the needle bearing 18.

It is to be appreciated that the thrust washers 21 and 23 may be designed to have a hardness of no less than Hv 700 as the thrust washers 20 and 22. In this case, the pawls 21a and 23a can be eliminated to allow the rotation of the thrust washers 21 and 23. Further, it is also possible to use only the thrust washers 20 and 22 and eliminate the thrust washers 21 end 23.

It is to be understood that this invention is not to be limited to the embodiment described above, and that various changes and modifications may be made without departing from the spirit and scope of the invention as defined in the appended claims.

What is claimed is:

1. A planet pinion carrier assembly for a planetary gear system, comprising:

a planet-pinion carrier having a rotation axis, said planet-pinion carrier including a first section extending radially with respect to the rotation axis and a second section radially extending and axially spacing a predetermined distance from said first section;

planet pinions each rotatably mounted onto a pinion shaft through bearing means, said pinion shaft extending between said first and second sections with its one axial end fixed to said first section and with its other axial end fixed to said second section, said planet pinions each having a first axial end facing said first section and a second axial end facing said second section;
a first thrust washer;
a second thrust washer;
a third thrust washer; and
a fourth thrust washer;
said first thrust washer and said third thrust washer being disposed between said first axial end of each planet pinion and said first section;
said second thrust washer and said fourth thrust washer being disposed between said second axial end of each planet pinion and said second section;
said first and secnd thrust washers each having a surface hardness which is in a range from Hv 700 to Hv 1500 and said third and fourth thrust washers each being made of a lubricated copper alloy, said third and fourth thrust washers being effective to prevent abrasion when said first and second thrust washers are subjected to loads in excess of a predetermined level.

2. A planet-pinion carrier assembly as set forth in claim 1, wherein said surface hardness extends across a maximum thickness of 60 μm from surfaces of each of said first and second thrust washers.

3. A planet-pinion carrier assembly as set forth in claim 2, wherein an inner portion of each of said first and second thrust washers has a hardness of no more than Hv 350.

4. A planet-pinion carrier assembly as set forth in claim 3, wherein said hardness of said inner portion is within a range from Hv 200 to Hv 350.

5. A planet-pinion carrier assembly as set forth in claim 1, wherein said bearing means is a needle roller bearing.

6. A planet-pinion carrier assembly as set forth in claim 1, wherein said first and second thrust washers are rotatably mounted onto said pinion shaft.

7. A planet-pinion assembly as set forth in claim 1, wherein each of said third and fourth thrust washers has a surface hardness of no less than Hv 700.

8. A planet-pinion assembly as set forth in claim 7, wherein each of said third and fourth thrust washers is mounted onto said pinion shaft so as to receive a thrust force.

9. A planet pinion carrier assembly for a planetary gear system, comprising:
a planet-pinion carrier having a rotation axis, said planet-pinion carrier including a first section extending radially with respect to the rotation axis and a second section radially extending and axially spacing a predetermined distance from said first section
planet pinions each rotatably mounted onto a pinion shaft through bearing means, said pinion shaft extending between said first and second sections with its one axial end fixed to said first section and with its other axial end fixed to said second section, said planet pinions each having a first axial end facing said first section and a second axial end facing said second section;
a first thrust washer disposed between said first axial end of each planet pinion and said first section;
a second thrust washer disposed between said second axial end of each planet pinion and said second section;
said first and second thrust washers each having a surface hardness in a range of Hv 700 to Hv 1500 wherein each of said first and second thrust washers is formed by applying a boron dipping process to a high carbon tool steel;
a third thrust washer disposed between said first thrust washer and said first section and in slidable contact with said first thrust washer; and
a fourth thrust washer disposed between said second thrust washer and said second section and in slidable contact with said second thrust washer;
wherein each of said third and fourth thrust washers is formed of a lubricated copper alloy material and is effective to prevent abrasion when said first and second thrust washers are placed under a predetermined high load.

10. A planet pinion carrier assembly for a planetary gear system, comprising:
a planet-pinion carrier having a rotation axis, said planet-pinion carrier including a first section extending radially with respect to the rotation axis and a second section radially extending and axially spacing a predetermined distance from said first section;
planet pinions each rotatably mounted onto a pinion shaft through bearing means, said pinion shaft extending between said first and second sections with its one axial end fixed to said first section and with its other axial end fixed to said second section, said planet pinions each having a first axial end facing said first section and a second axial end facing said second section;
a first thrust washer disposed between said first axial end of each planet pinion and said first section;
a second thrust washer disposed between said second axial end of each planet pinion and said second section;
said first and second thrust washers each having a surface hardness of no less than Hv 700;
a third thrust washer disposed between said first thrust washer and said first section in slidable contact with said first thrust washer; and
a fourth thrust washer disposed between said second thrust washer and said second section in slidable contact with said second thrust washer;
wherein each of said third and fourth thrust washers is formed of a copper alloy material and wherein the surface hardness of no less than Hv 700 of said first and second thrust washers is effective to prevent abrasion when said first and second thrust washers are placed under a predetermined high load.

11. A planet-pinion assembly for a planetary gear system, comprising:
a planet-pinion carrier having a rotation axis, said planet-pinion carrier including a first section extending radially with respect to the rotation axis and a second section radially extending and axially spacing a predetermined distance from said first section;
planet pinions each rotatably mounted onto a pinion shaft through bearing means, said pinion shaft extending between said first and second sections with its one axial end fixed to said first section and with its other axial end fixed to said second section, said planet pinions each having a first axial end facing said first section and a second axial end facing said second section;
a first thrust washer disposed between said first axial end of each planet pinion and said first section;

a second thrust washer disposed between said second axial end of each planet pinion and said second section;

said first and second thrust washers each having a surface hardness of no less than Hv 700;

a third thrust washer disposed between said first thrust washer and said first section in slidable contact with said first thrust washer; and a fourth thrust washer disposed between said second thrust washer and said second section in slidable contact with said second thrust washer;

wherein each of said third and fourth thrust washers is formed of a copper alloy material and wherein the surface hardness of no less than Hv 700 of said first and second thrust washers is effective to prevent abrasion when said first and second thrust washers are placed under a predetermined high load; and wherein each of said third and fourth thrust washers is prevented from rotating relative to said planet-pinion carrier by stopper means.

12. A planet-pinion carrier assembly as set forth in claim 11, wherein said stopper means includes a pawl provided at an outer periphery of each of said third and fourth thrust washers and an associated recess formed on each of said first and second sections, each pawl being fitted into said associated recess to prevent the rotation of the associated third or fourth thrust washer.

13. In a planet-pinion carrier assembly for a planetary gear system, said planet-pinion carrier assembly including:

a planet-pinion carrier having a rotation axis, said planet-pinion carrier including a first section extending radially with respect to the rotation axis and a second section radially extending and axially spacing a predetermined distance from said first section;

planet pinions each rotatably mounted onto a pinion shaft through bearing means, said pinion shaft extending between said first and second sections with its one axial end fixed to said first section and with its other axial end fixed to said second section, planet pinions each having a first axial end facing said first section and a second axial end facing said second section;

a first thrust washer disposed between said first axial end of each planet pinion and said first section;

a second thrust washer disposed between said second axial end of each planet pinion and said second section;

a method of forming each of said first and second thrust washers comprising:

applying a boron dipping process to a base material to provide each of said first and second thrust washers, said first and second thrust washers each having a surface hardness which is in a range of Hv 700 to Hv 1500 and which is effective to prevent abrasion under predetermined high loads.

14. A method as set forth in claim 13, wherein said surface hardness extends across a maximum thickness of 60 $\mu$m from surfaces of each of said first and second thrust washers.

15. A method as set forth in claim 14, wherein an inner portion of each of said first and second thrust washers has a hardness of no more than Hv 350.

16. A method as set forth in claim 13, wherein said base material is a high carbon tool steel.

17. A planet pinion carrier assembly for a planetary gear system, comprising:

a planet-pinion carrier having first and second radially extending sections;

a pinion shaft which extends between said first and second radially extending sections;

a planet pinion mounted on said pinion shaft through bearing means;

a first thrust washer made of high carbon tool steel which is surface hardened exclusively by boron dipping to a depth of approximately 60 $\mu$m so as to have a surface hardness of Hv 700 to Hv 1500 and which has an internal portion enclosed by said surface hardending having a hardness of no more than Hv 350;

a second thrust washer made of said high carbon tool steel which is surface hardened exclusively by boron dipping to a depth of approximately 60 $\mu$m so as to have a surface hardness of Hv 700 to Hv 1500 and which has an internal portion enclosed by said surface hardening having a hardness of no more than Hv 350;

a third thrust washer made of a lubricated copper alloy; and a fourth thrust washer made of said lubricated copper alloy;

said first thrust washer and said third thrust washer being disposed on a first side of said pinion between said pinion and said first section;

said second thrust washer and said fourth thrust washer being disposed on a second side of said pinion between said pinion and said second section.

18. A planet pinion carrier assembly as set forth in claim 17, wherein said pinion shaft is formed with a lubrication bore which is fluidly communicated with a source of lubricating oil.

* * * * *